United States Patent
Obser et al.

(10) Patent No.: US 6,826,907 B2
(45) Date of Patent: Dec. 7, 2004

(54) HYDRODYNAMIC COUPLING

(75) Inventors: Stephan Obser, Satteldorf (DE); Kurt Adleff, Crailsheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 39 days.

(21) Appl. No.: 10/296,843

(22) PCT Filed: Mar. 22, 2002

(86) PCT No.: PCT/EP02/03246

§ 371 (c)(1),
(2), (4) Date: May 16, 2003

(87) PCT Pub. No.: WO02/077482

PCT Pub. Date: Oct. 3, 2002

(65) Prior Publication Data

US 2003/0172649 A1 Sep. 18, 2003

(30) Foreign Application Priority Data

Mar. 28, 2001 (DE) .......................... 101 15 561

(51) Int. Cl.⁷ ............................................ F16D 33/00
(52) U.S. Cl. ........................................ 60/330; 60/362
(58) Field of Search .......................... 60/330, 362, 364, 60/366

(56) References Cited

U.S. PATENT DOCUMENTS

| | | | |
|---|---|---|---|
| 2,167,382 A | * | 7/1939 | Alison .......................... 60/366 |
| 2,707,376 A | | 5/1955 | Anderson |
| 3,237,409 A | | 3/1966 | Becker |
| 4,073,139 A | * | 2/1978 | Armasow et al. .............. 60/364 |
| 4,345,884 A | * | 8/1982 | Longiny et al. ............... 60/364 |

FOREIGN PATENT DOCUMENTS

| | | |
|---|---|---|
| DE | 244 279 | 3/1912 |
| DE | 1 475 440 | 6/1969 |
| DE | 1 750 761 | 2/1971 |
| DE | 3 522 174 | 5/1986 |
| DE | 270 744 | 8/1989 |
| DE | 692 02 892 | 6/1995 |
| JP | 57 129931 | 8/1982 |

* cited by examiner

*Primary Examiner*—Edward K. Look
*Assistant Examiner*—Michael Leslie
(74) *Attorney, Agent, or Firm*—Merchant & Gould P.C.

(57) ABSTRACT

The invention relates to a hydrodynamic coupling. Said coupling comprises a primary wheel (2; 2.2; 2.3) and a secondary wheel (3; 3.2; 3.3), which together form a toroidal working chamber (4; 4.2; 4.3), a shell (5; 5.2; 5.3), which is connected in a rotationally fixed manner to the primary wheel and surrounds the secondary wheel in the axial direction and at least partially in the radial direction, thus forming an intermediate chamber (6; 6.2; 6.3) and at least one passage (8; 8.2; 8.3) that is located in the outer radial area of the shell. The invention is characterised by the following features: a second shell (10; 10.2; 10.3) coupled in a rotationally fixed manner to the first shell and/or the primary wheel, thus forming a second intermediate chamber (11; 11.2; 11.3); the second intermediate chamber is connected to the first intermediate chamber via the passage (13; 13.2; 13.3); at least one passage in the outer radial area of the second shell, the passage or passages in the first shell and the passage or passages of the second shell being offset in relation to one another, when viewed from the peripheral direction.

10 Claims, 1 Drawing Sheet

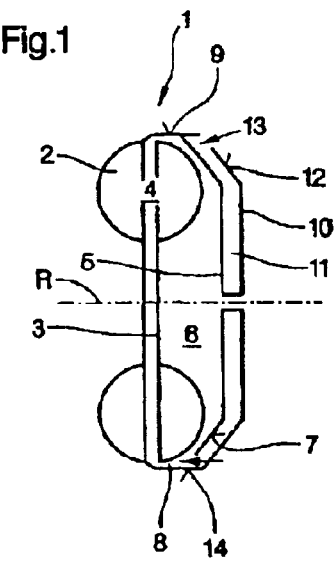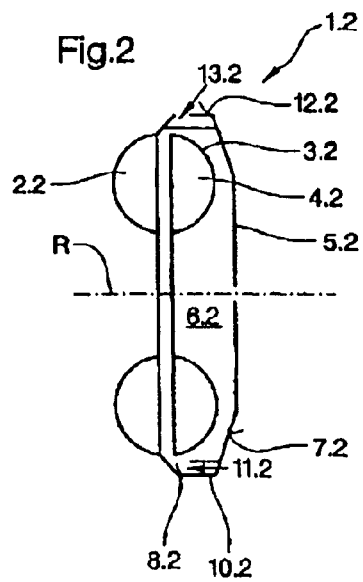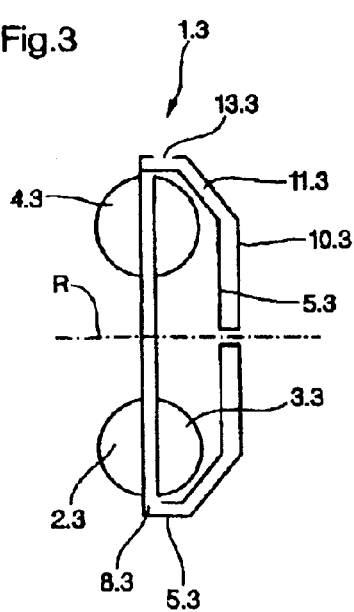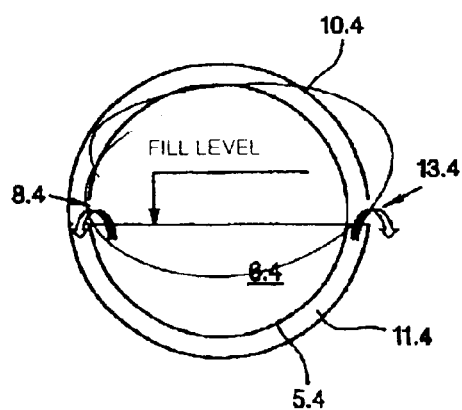

HYDRODYNAMIC COUPLING

The invention relates to a hydrodynamic coupling, in particular having the features of the preamble of claim 1.

Hydrodynamic couplings are known in different embodiments from a multitude of publications. As representative, reference is made to Volth publication Nr. CR 277d 5.00 1000. This discloses a hydrodynamic coupling with an integrated oil-supply arrangement. This includes a primary wheel functioning as a pump wheel and a secondary wheel; assigned to the primary wheel is a so-called shell that is connected to the latter in a rotationally-fixed manner and surrounds the secondary wheel in the axial extension and at least over a portion of the radial extension. The shell displays passages in the region of its outer periphery, in particular in the region of the radially outer dimensions, which passages make possible the passing of operating medium from the shell into an additional catch shell that is coupled in a rotationally-fixed manner to this shell, from which additional shell the operating medium is conducted by means of a dynamic pressure pump in a closed circuit during the operation of the hydrodynamic coupling. In the case of the disconnection of the hydrodynamic coupling, by virtue of the arrangement of the passages in the shell there occurs by effect of centrifugal force an emptying of the toroidal work chamber and, conditioned by this, an emptying of the intermediate chamber defined by the shell. The complete emptying thereby achieved is, however, not desired in every case, in particular in application cases that due to frequently alternating filling and emptying processes require a very quick filling process in order to ensure a rapid transfer of torque.

The invention is thus based on the task of further developing, with low structural and production technology expense, a hydrodynamic coupling of the type specified in the introduction such that during operation the filling via the inlet is sustained, while the outflow through the nozzles is ensured, and that during the standstill of the coupling a partial filling is ensured. In this way:

the fill supply can be shortened in the case of a desired quick placing into operation and/or in each operating state of the hydrodynamic coupling the power transmission between the rotor parts can be ensured.

The solution according to the invention is characterized through the features of claim 1. Advantageous configurations are specified in the dependent claims.

The hydrodynamic coupling comprises a primary wheel and a secondary wheel that together form a toroidal working chamber. Connected in a rotationally fixed manner to the primary wheel is a shell (referred to as the first shell in the following) which surrounds the secondary wheel in the axial extension and at least over a portion of the radial extension while forming an intermediate chamber. The shell displays at least one passage that is arranged in the radially outer region of the shell. According to the invention, coupled to the shell and/or the primary wheel is an additional shell that forms a second intermediate chamber, which is connected to the first intermediate chamber via the passages in the first shell. The second shell likewise displays in its radially outer region at least one passage that connects the second intermediate chamber with the environment or with the interior of a hydrodynamic coupling formed by a housing or, in the case of installation in a drive apparatus, the housing of the latter. According to the invention, furthermore the passages in the first shell and the second shell are, when viewed in the peripheral direction, offset in relation to each other, so that the operating medium after emerging into the first shell is not immediately flung off into the environment, but rather must cover a particular flow route in the second intermediate chamber before it exits entirely from the hydrodynamic coupling.

According to an especially advantageous configuration, the passages in the first shell and in the second shell are rotated 180 degrees with respect to each other in the direction of the periphery. Viewed in the radial direction starting from the axis of rotation, the passages here lie either on the same radius or the passage on the second shell lies on a larger radius than the passage on the first shell. Based on their spatial arrangement with respect to each other, one can also speak of the first shell as the inner shell and the second shell as the outer shell.

The solution according to the invention makes possible the fact that even during standstill or still during the emptying process of the hydrodynamic coupling a certain fill amount always remains in the hydrodynamic coupling, by virtue of the favorable, restricted guidance in the second, i.e. outer shell up to the exit point. This partial filling in the standstill condition offers the advantage that, when operation of the hydrodynamic coupling is restarted, a certain supply of operating medium is already available, which supply need not first be provided via the operating medium supply system, which can lead to a temporal delay during the filling. In particular for application cases that are here characterized through a rapid alternation between startup of operation and shutdown of operation of the hydrodynamic coupling, this solution offers a considerable advantage in that the forces, due to the operating medium, opposed to the startup of operation are negligibly small. Special filling pumps with especially high pumping capacity are not needed.

Regarding the concrete embodiment of the second, i.e. outer shell and therewith the assignation of the intermediate chamber to the first, i.e. inner shell, and/or to the first intermediate chamber formed by the inner shell, several possibilities exist. According to the structural space conditions the following solutions are embraced:

a) arrangement of the second intermediate chamber, formed by the second or outer shell, in the axial direction next to the first intermediate chamber formed by the first or inner shell b) arrangement of the second, outer intermediate chamber on the outside in the radial direction, that is, enclosing the first intermediate chamber in the radial direction In the first-mentioned case, the intermediate chamber extends preferably in the radial direction into the region of the radial extent of the first intermediate chamber, that is to say, no gradation is present between the first and the second shells, which are arranged next to each other. Striven for in the second case is preferably an extending of the second intermediate chamber in the axial direction in a magnitude that corresponds to the maximal extension of the first intermediate chamber in the axial direction. With these two solutions, a coupling configuration that is optimal with respect to the possible ventilation losses can be worked out. However, it is also conceivable to realize a combination of both solutions, so that the second, outer intermediate chamber encloses, as it were, the first intermediate chamber in both the axial and radial directions, in which both are separated by the wall of the first, inner shell.

The passages, in the simplest case, can be embodied as perforation bores. However, these can also be provided with cross-sectional variations, according to desired additional effects. This applies also to the alignment of the passages.

These can be radially aligned or at an angle with respect to a perpendicular to the rotational axis.

Regarding the concrete structural configuration, especially the connection, of the second, outer coupling shell to the first, inner coupling shell and/or to the primary wheel, there exist a multitude of possibilities, which, however, lie within the normal scope of activity of the competent specialist. The outer, second intermediate chamber is here present as a ring chamber or ring-shaped channel corresponding to the configuration of the second shell.

In the following, the solution according to the invention is explained with the aid of figures. These show in particular:

FIG. 1: in a schematic, greatly simplified representation, a first embodiment of a hydrodynamic coupling designed according to the invention with intermediate chambers arranged next to each other FIG. 2: in a schematic, greatly simplified representation, a first embodiment of a hydrodynamic coupling designed according to the invention with intermediate chambers arranged radially one upon the other FIG. 3: an embodiment with extension of the second intermediate chamber in the axial and radial directions FIG. 4: with the aid of a simplified representation of section perpendicular to the axial sectional plane, the arrangement of the individual passages FIG. 1 illustrates, in schematic, greatly simplified representation, a hydrodynamic coupling 1 designed according to the invention in axial section. This comprises a primary wheel 2, which in the traction operation functions as a pump wheel, and a secondary wheel 3 functioning as a turbine wheel, which together form a toroidal working chamber 4. Assigned to the primary wheel 2 is a shell 5, which is connected to the primary wheel 2 in a rotationally fixed manner and encloses the secondary wheel 3 in the axial direction and at least partially in the radial direction while forming a first intermediate chamber 6. Provided in the region of the outer periphery 7 of the shell 6 is at least one passage 8, which makes possible the passing of operating medium located in the first intermediate chamber 6 out of the shell 5. The passage 8 is arranged in the radially outer region 9 of the shell 5. The first intermediate chamber 6, which is bounded by the shell 5, here extends in both the radial and axial directions. According to the invention, an additional, second shell 10 is provided, which is associated with the first shell 5 while forming an additional, second intermediate chamber 11. The second shell 10 is attached in a rotationally-fixed manner either directly to the first shell 5, or directly to the primary wheel 2. The second shell 10, in the embodiment according to FIG. 1, is assigned to the first shell 5 in the axial direction, so that the second intermediate chamber 11 extends in both the axial and radial directions. Here, as shown in FIG. 1, the second shell 10 is arranged next to the first shell 5, with the passage 8 in the first shell connecting the first intermediate chamber 6 to the second intermediate chamber 11. Furthermore, according to the invention, for the exit of operating medium from the second shell 10 at least one passage 13 is provided in the region of the outer periphery 12 of the second shell 10; these passages 13 arranged in the second shell 10, considered in reference to the rotational axis R, are arranged in an offset manner with respect to the passage 8 in the first shell. Preferably, the arrangement with respect to the axis of rotation occurs in a mirror-image manner with respect to the passage 8 in the first shell 5, that is to say, with an offset of approximately 180 degrees. The arrangement of the passage 13 takes place in the radially outer region 14 of the second shell 10. In the embodiment represented in FIG. 1, the two intermediate chambers—the first intermediate chamber 6 and the second intermediate chamber 11—are arranged next to each other in the axial direction, a separation taking place by means of the wall of the first shell 5.

FIG. 2 illustrates an additional embodiment of a hydrodynamic coupling 1.2 designed according to the invention comprising a primary wheel 2.2 and a secondary wheel 3.2, which together form a toroidal working chamber 4.2. Here too the primary wheel 2 [translators' note: should read "2.2"] is coupled to a shell 5.2 in a rotationally fixed manner, which shell bounds a first intermediate chamber 6.2. The first intermediate chamber here extends, in relation to the toroidal working chamber 4.2, in both the radial and axial directions with respect to the rotational axis R. Here also, provided in the region of the outer periphery 7.2, in particular the radially outer region 9.2 of the shell 5 [translators' note: should read "5.2"] is a passage 8.2. This passage connects the first intermediate chamber 6.2 to an additional intermediate chamber 11.2 enclosed by a second shell 10.2. The second intermediate chamber 11.2 is here bounded by the second shell 10.2, which encloses the first shell 5.2 in the radial direction relative to the rotational axis R and thus forms a ring-shaped intermediate chamber, namely the intermediate chamber 11.2. The two intermediate chambers—the first intermediate chamber 6.2 and the second intermediate chamber 11.2—are thus arranged next to each other in the radial direction. A passing of operating medium from the second intermediate chamber 11.2 to the environment is possible via at least one passage 13.2 in the region of the outer periphery 12.2 of the second shell 10.2. The outer periphery 12.2 here corresponds to the radially outer region 14.2. Here likewise, the passage 8.2 and the passage 13.2 are designed as offset with respect to each other, considered in the peripheral direction, preferably in an angle of 180 degrees relative to each other.

FIG. 3 illustrates a further embodiment of a hydrodynamic coupling 1.3 designed according to the invention, in which the second intermediate chamber 11.3 extends in both the axial and radial directions next to and partially around the first intermediate chamber 6.2 [translators' note: should read "6.3"]. Here too the first shell 5.2 [translators' note: should read "5.3"] is coupled to the primary wheel 2 [translators' note: should read "2.3"] in a rotationally fixed manner such that this first shell encloses the secondary wheel 3.3 in the axial and radial directions. The second intermediate chamber 11.3 is formed here by a second shell 10.3, which is connected to the primary wheel 2.3 and to the first shell 5.3 in a rotationally fixed manner such that the first shell 5.3 is enclosed at least partially in the axial direction as well as in the radial direction. This means that the wall of the second shell 11.3 extends in the axial direction next to the first shell 5.3 and in the radial direction over the outer dimensions at the outer periphery of the first shell 5.3. Here too, the arrangement of the passages 8.3 and 13.3 takes place preferably in the region of the radially outer dimensions in each case, so that under the influence of the centrifugal force an optimal and rapid transport of the operating medium desired to be emptied can take place.

In the embodiments represented in FIGS. 1 and 2, the extension of the second intermediate chamber 11 or 11.2, respectively, is adapted in each case to the extension of the first intermediate chamber 6 or 6.2, respectively. In FIG. 1, this means an extension in the radial direction analogous to the extension of the first intermediate chamber 6, while in FIG. 2 the axial extension of the second intermediate chamber 11.2 does not substantially occur over the axial extension of the first intermediate chamber 6.2. In order to avoid unnecessary losses through a stepped configuration of the outer contour of the hydrodynamic coupling 1, there preferably occurs a matching or laying out of the individual intermediate chambers so that steps, i.e. large, sudden changes in diameter, are avoided.

FIG. 4 illustrates, in greatly schematized representation in a sectional plane perpendicular to the axial sectional plane of a hydrodynamic coupling 1.4, the arrangement of the passages 8.4 and 13.4 on the individual shells 5.4 and 10.4, respectively. It is evident here that the two passages 8.4 and 13.4 are arranged offset with respect to each other by an angle, preferably 180 degrees, in the peripheral direction. In order to attain a minimal fill state (the fill state height is here labeled with 15) [translators' note: label not visible in FIG. 4] in the standstill condition, the corresponding arrangement of the bores is here necessary. Upon rotation around the rotational axis, operating medium flows through the toroidal working chamber 4.4, which medium travels outwardly into the first shell 5.4 due to centrifugal force, from where the operating medium, likewise due to centrifugal force, reaches the second intermediate chamber 11.4 via the passage 8.4, from which chamber it is released via the passage 13.4 into the environment or into the housing, again due to centrifugal force. The passages are here preferably arranged on the same radius, or the passage in the second shell is arranged on a larger radius than that of the first shell. In order to make possible, instead of an immediate and complete emptying, a partial fill state in the standstill condition, which partial fill state is independent of the position of the first shell and thus also the second shell, the operating medium is conducted from the first shell 5.4 via the second intermediate chamber 11.4 before it exits into the environment or into the housing.

REFERENCE NUMERAL LIST

1; 1.2; 1.3 hydrodynamic coupling
2; 2.2; 2.3 primary wheel
3; 3.2; 3.3 secondary wheel
4; 4.2; 4.3 toroidal working chamber
5; 5.2; 5.3 shell
6; 6.2; 6.3 first intermediate chamber
7; 7.2; 7.3 outer periphery of the first shell
8; 8.2; 8.3 passage
9; 9.2; 9.3 radially outer region
10; 10.2; 10.3 second shell
11; 11.2; 11.3 second intermediate chamber
12; 12.2; 12.3 outer periphery
13; 13.2; 13.3 passage
14; 14.2; 14.3 radially outer region
15; 15.2; 15.3 fill state height [translators' note: numeral does not appear on drawings]
R rotational axis

What is claimed is:

1. Hydrodynamic coupling (1; 1.2; 1.3);
    having a primary wheel (2; 2.2; 2.3) and a secondary wheel (3; 3.2; 3.3), which together form a toroidal working chamber (4; 4.2; 4.3);
    having a shell (5; 5.2; 5.3) that is connected to the primary wheel (2; 2.2; 2.3) in a rotationally fixed manner and encloses the secondary wheel (3; 3.2; 3.3) in the axial direction and at least partially in the radial direction while forming an intermediate chamber (6; 6.2; 6.3);
    having at least one passage (8; 8.2; 8.3) that is arranged in the radially outer region (9; 9.2; 9.3) of the shell (5; 5.2; 5.3);

characterized through the following features:
    having an additional, second shell (10; 10.2; 10.3) coupled to the shell (5; 5.2; 5.3) and/or to the primary wheel (2; 2.2; 2.3) in a rotationally fixed manner while forming an additional, second intermediate chamber (11; 11.2; 11.3);
    the second intermediate chamber (11; 11.2; 11.3) is connected to the first intermediate chamber (6; 6.2; 6.3) via the passage or passages (8; 8.2; 8.3);
    having at least one passage (13; 13.2; 13.3) in the radially outer region (14; 14.2; 14.3) of the second shell (10; 10.2; 10.3), the passage or passages (8; 8.2; 8.3) in the first shell (5; 5.2; 5.3) and the passage or passages (13; 13.2; 13.3) of the second shell (10; 10.2; 10.3) being offset in relation to one another, when viewed from the peripheral direction.

2. Hydrodynamic coupling (1; 1.2; 1.3) according to claim 1, wherein the passage or passages (8; 8.2; 8.3) of the first shell (5; 5.2; 5.3) and the passage or passages (13; 13.2; 13.3) of the second shell (10; 10.2; 10.3) are arranged offset in relation to one another by an angle of 180 degrees, when viewed from the peripheral direction.

3. Hydrodynamic coupling (1) according to claim 1, wherein the second intermediate chamber (11) is arranged next to the first intermediate chamber (6) in the axial direction.

4. Hydrodynamic coupling (1) according to claim 3, wherein the second intermediate chamber (11) displays an extension in the radial direction that is equal to or less than the radial extension of the first intermediate chamber (6).

5. Hydrodynamic coupling (1) according to claim 3 wherein the passage or passages (8) in the first shell (5) and the passage or passages (13) in the second shell (10) are arranged, in each case, on radii or diameters having the same dimensions, in relation to the axis of rotation R.

6. Hydrodynamic coupling (1.2) according to claim 1, wherein the second intermediate chamber (10.2) encloses the first intermediate chamber (6.2) in the radial direction.

7. Hydrodynamic coupling (1.2) according to claim 6, wherein the extension of the second intermediate chamber (11.2) in the axial direction is equal to or less than the axial extension of the first intermediate chamber (6.2).

8. Hydrodynamic coupling (1.2) according to claim 6, wherein the passage or passages (13.2) in the second shell (10.2) is/are arranged on a larger diameter than the passage or passages (8.2) of the first shell (5.2).

9. Hydrodynamic coupling (1.3) according to claim 1, wherein the second intermediate chamber (11.3) at least partially encloses the first intermediate chamber (6.3) in both the axial and radial directions, and that the passage or passages (13.3) in the second shell (10.3) have a diameter that, with respect to its dimensions, is equal to or greater than that of the passage or passages (8.3) in the first shell (5.3).

10. Hydrodynamic coupling according to claim 1, wherein the passage or passages (8; 8.2; 8.3) in the first shell (5; 5.2; 5.3) and the passage or passages (13; 13.2; 13.3) of the second shell (10; 10.2; 10.3) are offset in relation to one another at an angle in the range of 90° to 270°, when viewed from the peripheral direction.

* * * * *